(12) United States Patent
Ray

(10) Patent No.: US 9,291,786 B2
(45) Date of Patent: Mar. 22, 2016

(54) GROMMET FOR FIBER OPTIC ENCLOSURES

(71) Applicant: All Systems Broadband, Inc., Livermore, CA (US)

(72) Inventor: Craig Dwayne Ray, Fuquay-Varina, NC (US)

(73) Assignee: All Systems Broadband, Inc., Livermore, CA (US)

( * ) Notice: Subject to any disclaimer, the term of this patent is extended or adjusted under 35 U.S.C. 154(b) by 128 days.

(21) Appl. No.: 14/144,656

(22) Filed: Dec. 31, 2013

(65) Prior Publication Data

US 2015/0184777 A1 Jul. 2, 2015

(51) Int. Cl.
*G02B 6/44* (2006.01)
*H02G 3/08* (2006.01)
*H02G 15/013* (2006.01)
*H01R 13/52* (2006.01)
*F16L 5/10* (2006.01)

(52) U.S. Cl.
CPC .......... *G02B 6/4444* (2013.01); *H01R 13/5205* (2013.01); *H02G 3/088* (2013.01); *F16L 5/10* (2013.01); *H02G 15/013* (2013.01)

(58) Field of Classification Search
CPC ........ Y10T 16/05; Y10T 16/063; H02G 3/22; H02G 3/24; H02G 3/36; H02G 3/083; H02G 3/088; H02G 15/007; H02G 15/013; H02G 15/04; H01R 13/5205; G02B 6/4444; B60R 16/0222; B60R 16/0215; F16L 5/10
See application file for complete search history.

(56) References Cited

U.S. PATENT DOCUMENTS

| 4,259,542 | A | * | 3/1981 | Tehan et al. | 174/483 |
| 4,732,519 | A | * | 3/1988 | Wagner | 411/337 |
| 5,123,862 | A | * | 6/1992 | Suzuki | 439/533 |
| 5,898,129 | A | | 4/1999 | Ott et al. | |
| 5,969,294 | A | * | 10/1999 | Eberle et al. | 174/57 |
| 6,190,185 | B1 | * | 2/2001 | Daoud | 439/135 |
| 6,201,920 | B1 | | 3/2001 | Noble et al. | |
| 6,362,422 | B1 | | 3/2002 | Vavrik et al. | |
| 6,385,381 | B1 | | 5/2002 | Janus et al. | |
| 6,591,053 | B2 | | 7/2003 | Fritz | |
| 7,049,515 | B1 | * | 5/2006 | Collins et al. | 174/668 |
| 7,200,316 | B2 | | 4/2007 | Giraud et al. | |
| 7,499,622 | B2 | | 3/2009 | Castonguay et al. | |
| 7,620,287 | B2 | | 11/2009 | Appenzeller et al. | |
| 7,668,431 | B2 | | 2/2010 | Cox et al. | |
| 8,301,003 | B2 | | 10/2012 | de los Santos Campos et al. | |
| 8,798,427 | B2 | * | 8/2014 | Cox et al. | 385/135 |
| 9,136,686 | B2 | * | 9/2015 | Starke | H02G 3/22 |
| 2003/0000726 | A1 | * | 1/2003 | Miyakoshi | 174/65 R |

(Continued)

*Primary Examiner* — Kristina Fulton
*Assistant Examiner* — Nicholas L Foster
(74) *Attorney, Agent, or Firm* — Murphy, Bilak & Homiller, PLLC

(57) ABSTRACT

A grommet for use with a fiber optic enclosure having an opening adapted to receive the grommet so as to provide a substantially sealed passage for one or more fiber optic cables passing through the grommet and the opening. The grommet comprises a U-shaped central portion defining an inner face and a first portion of an outer face of the grommet, where the inner face and outer face are separated by a first thickness. The U-shaped central portion further includes a thinned, penetrable region at or near a center area of the U-shaped central portion and forming part of the first portion of the outer face of the grommet, the thinned, penetrable region having a second thickness substantially smaller than the first thickness.

4 Claims, 5 Drawing Sheets

(56) References Cited

U.S. PATENT DOCUMENTS

2007/0246962 A1* 10/2007 Reed et al. .................. 296/37.1
2008/0253730 A1* 10/2008 Cox et al. ..................... 385/138
2009/0250885 A1* 10/2009 Sasaki et al. ................. 277/627
2011/0042123 A1* 2/2011 Sempliner et al. ........ 174/152 G
2011/0164854 A1 7/2011 Desard et al.
2011/0262099 A1* 10/2011 Castonguay ......... G02B 6/3897
　　　　　　　　　　　　　　　　　　　　　　　385/135

* cited by examiner

GROMMET FOR FIBER OPTIC ENCLOSURES

TECHNICAL FIELD

The present invention is generally related to fiber optic enclosures and is more particularly related to grommets for sealing enclosure openings through which one or more fiber optic cables enter the fiber optic enclosures.

BACKGROUND

Fiber optic enclosures of various types and sizes may be deployed at any of a number of locations in a fiber optic network, such as at a subscriber demarcation point. These enclosures typically include at least one opening through which one or more fiber optic cables enter or exit the enclosure.

It is generally desirable to at least partly seal the openings in the enclosure, whether or not fiber optic cables are routed through them, to prevent incursions by dust, rain, pests, etc.

In some systems, openings in fiber optic enclosures have been sealed using any of various combinations of metal plates and compression fittings through which the fiber optic cable can be routed and secured. These solutions are typically rather expensive and often require tools and additional time to install. Solutions that use a compression nut are also poorly suited to scenarios in which multiple cables must be passed through the opening.

In other cases, grommets that include several concentric, removable portions of various diameters have been used, where a field technician removes an appropriately sized portion to allow the fiber optic cable or cables to pass through the grommet. While cheaper and easier to install than solutions based on the use of a compression nut, for example, many of these grommet-based solutions may lack sufficient strength and flexibility.

SUMMARY

Embodiments of the present invention include a grommet for use with a fiber optic enclosure having an opening adapted to receive the grommet so as to provide a substantially sealed passage for one or more fiber optic cables passing through the grommet and the opening. According to several embodiments, the grommet comprises a U-shaped central portion defining an inner face and a first portion of an outer face of the grommet, where the inner face and outer face are separated by a first thickness. The U-shaped central portion further includes a thinned, penetrable region at or near a center area of the U-shaped central portion and forming part of the first portion of the outer face of the grommet, the thinned, penetrable region having a second thickness substantially smaller than the first thickness.

The grommet further includes a pair of winged portions extending laterally from the U-shaped central portion, each winged portion defining an additional portion of the outer face and having an inner surface opposite the additional portion of the outer face and separated from the additional portion of the outer face by a third thickness that is substantially smaller than the first thickness. A slot having inner and outer sidewalls extends around the outer periphery of a U-shaped wall formed by the U-shaped central portion, and is positioned so that the outer sidewall is planar with and forms a continuous surface with the inner surface of the winged portions. A retention feature extends from the inner surface of each winged portion, each retention feature having a sidewall substantially perpendicular to the inner surface of the winged portion. In some embodiments, each retention feature comprises a disc-shaped protrusion extending from the inner surface of the corresponding winged portion.

In some embodiments, the thinned, penetrable region comprises a slit extending along the outer face of the grommet and extending at least partly through the thinned, penetrable region. In some of these and in some other embodiments, the thinned, penetrable region comprises one or more perforations extending at least partly through the thinned, penetrable region.

Other embodiments of the present invention include a fiber optic enclosure system that includes a housing comprising a plurality of outer walls defining a housing interior volume as well as one or more grommets as described above. A first outer wall of the housing includes a substantially U-shaped opening dimensioned to receive the grommet so that the grommet fully occupies the U-shaped opening and so that an edge of the substantially U-shaped opening is positioned within the slot of the grommet. The first outer wall further comprises a pair of openings positioned and dimensioned to receive the retention features of the grommet when the grommet is positioned within and fully occupies the U-shaped opening.

DETAILED DESCRIPTION

As noted above, fiber optic enclosures of various types and sizes may be deployed at any of a number of locations in a fiber optic network, such as at a subscriber demarcation point. These enclosures typically include at least one opening through which one or more fiber optic cables enter or exit the enclosure.

Figure 1:
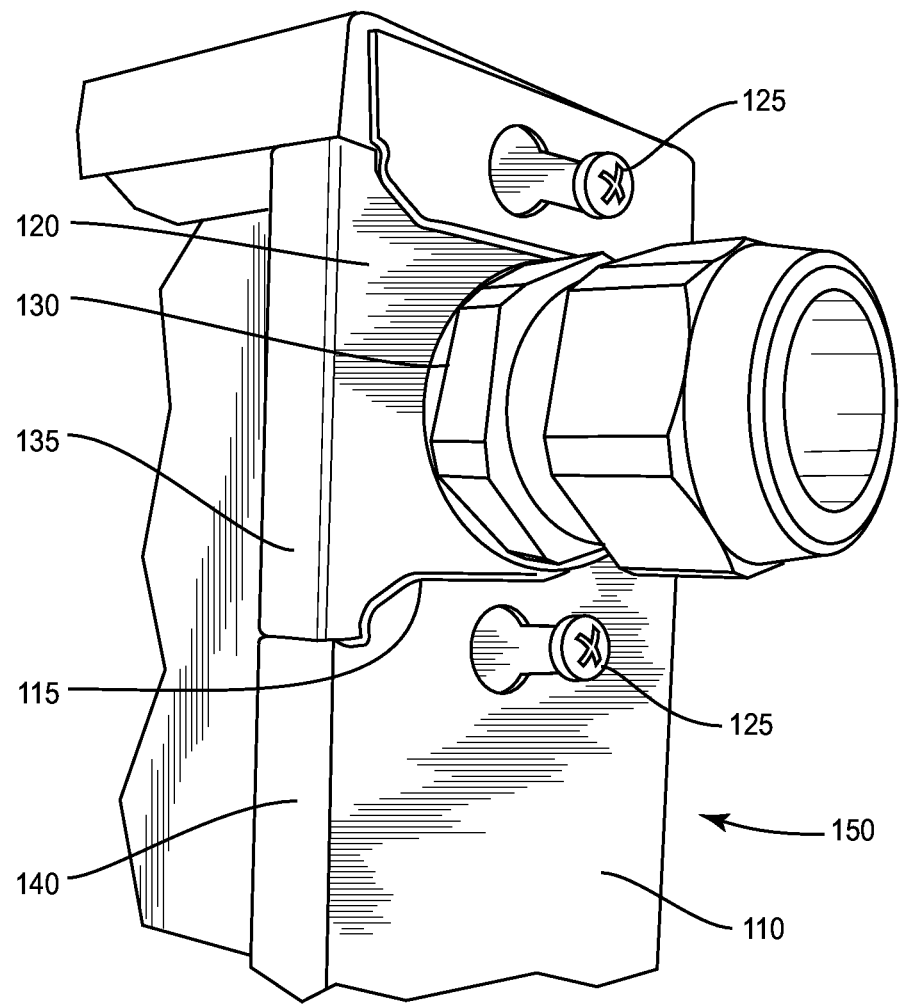
FIG. 1 illustrates a fiber optic enclosure having an opening sealed by a metal panel and a compression nut.

FIG. 1 illustrates a portion of one such enclosure. The illustrated enclosure includes a housing 150, which in turn comprises several side walls 110. An opening 115 is formed in one of the side walls 110; this opening is provided to allow one or more fiber optic cables to pass in and out of the enclosed area within the enclosure.

In FIG. 1, the opening 115 is occupied by a metallic plate 120, which is secured to the side wall 110 by a pair of screws 125 passing through additional (keyhole-shaped) openings in the enclosure side wall 110. The metallic plate 120 has an opening through which a compression fitting assembly 130 is installed. One end of a fiber optic cable (not shown in FIG. 1) can be passed through the compression fitting assembly 130, after which the compression fitting can be tightened to secure the fiber optic cable in place and seal the opening.

Also of note in FIG. 1 is that metal plate 120 has a top portion 135 that is arranged to form a nearly continuous flat surface with a top side 140 of the side wall 110. This allows the underside of an enclosure lid (not shown) to form a tight and continuous seal with the enclosure side walls, especially if a gasket is applied to the underside of the enclosure lid or along the top side 140 of the side wall 110 and along the top portion 135 of metal plate 120.

A compression fitting like the compression fitting 130 shown in FIG. 1 is designed to secure a single, cylindrical cable. Accordingly, the compression fitting 130 in FIG. 1 is poorly suited to accommodate the passage of two or more fiber optic cables into the enclosure 100.

Figure 2B:
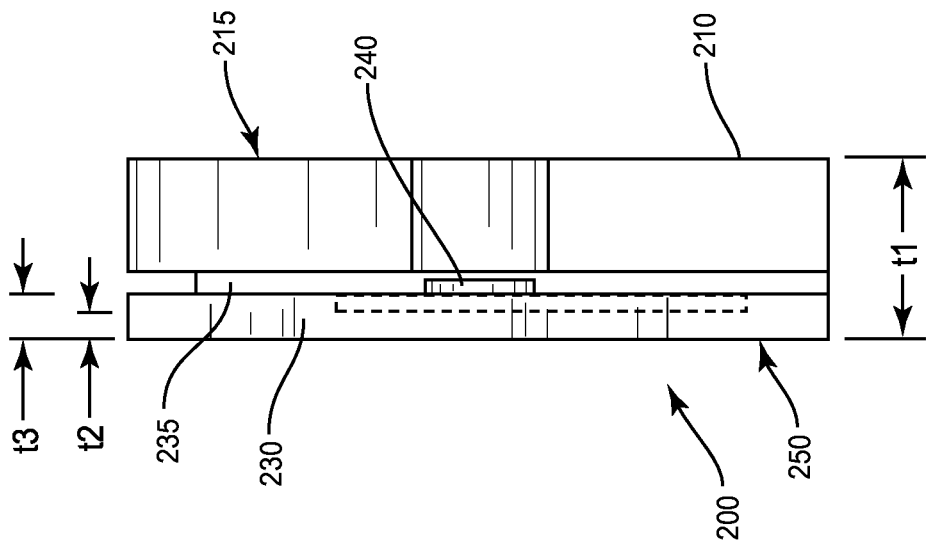
FIGS. 2A-2C illustrate a grommet according to one or more embodiments of the present invention.
Figure 2A:
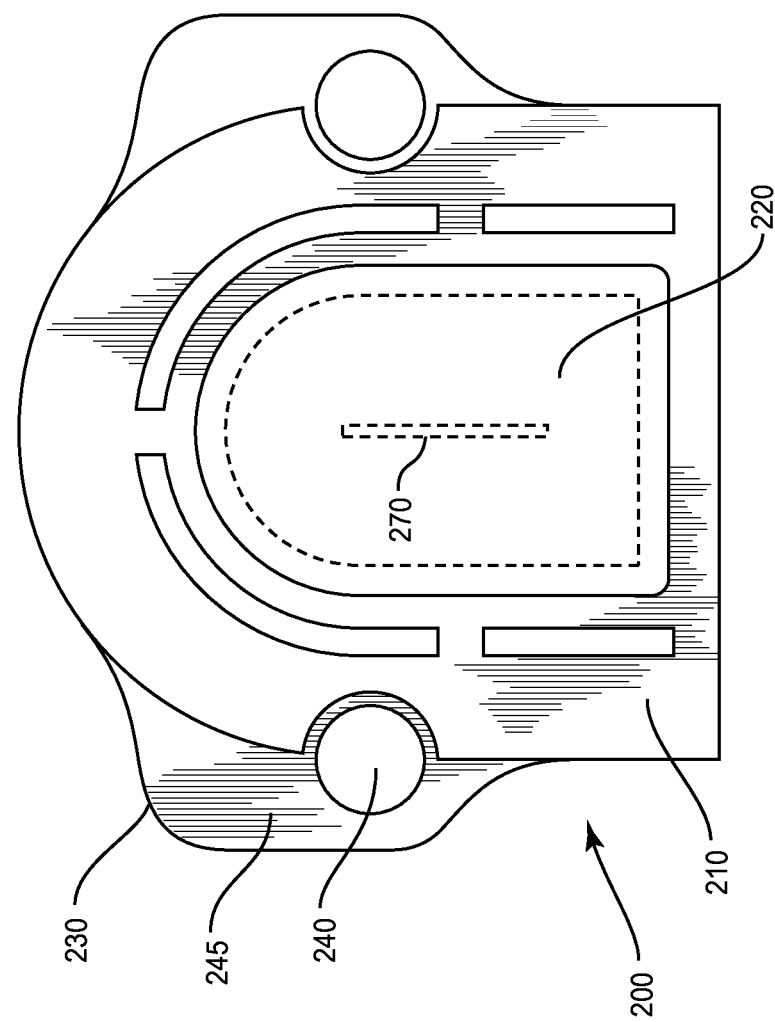
Figure 2C:
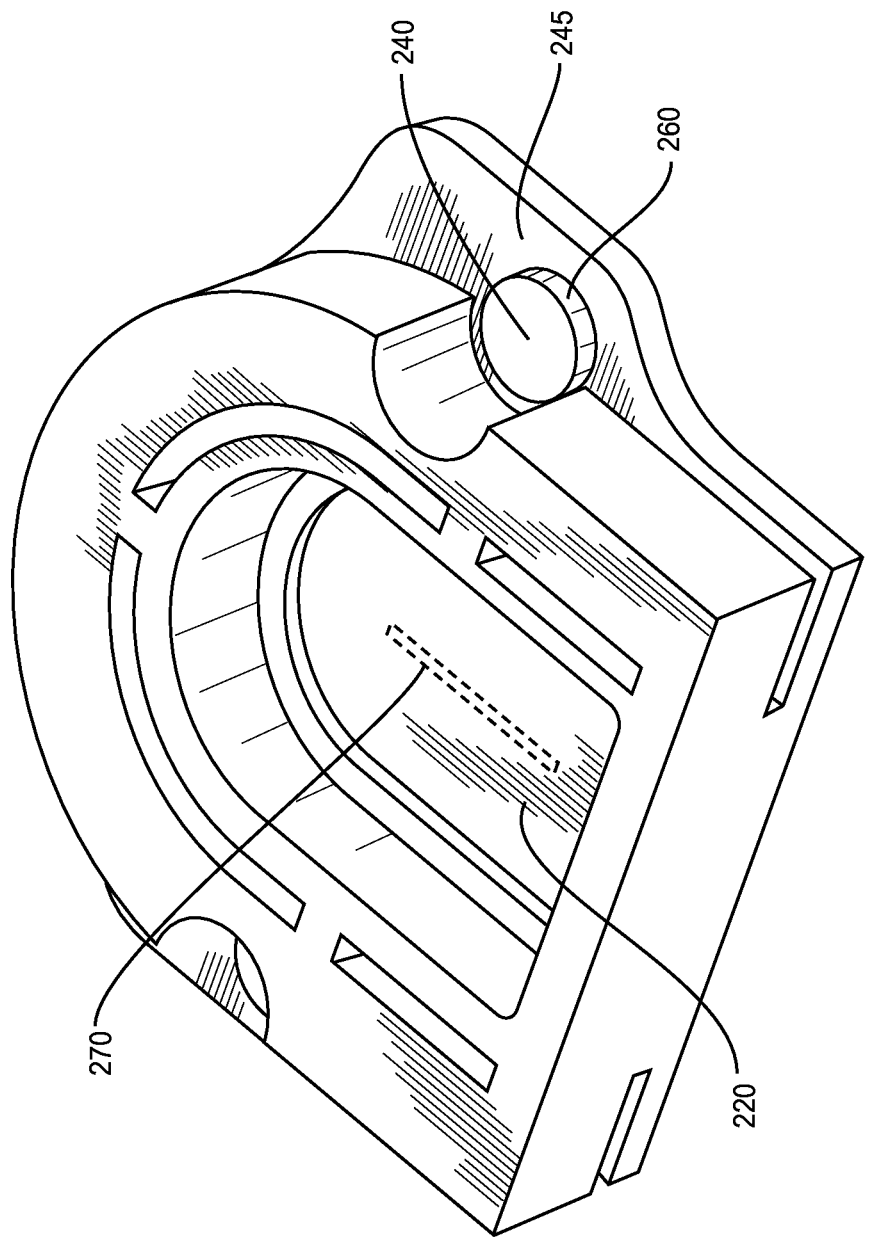

FIG. 2 illustrates a flexible grommet 200 that provides a better solution than that illustrated in FIG. 1, at least in cases where it is necessary that more than one fiber optic cable pass through the opening. In any case, the flexible grommet 200 provides a less expensive solution than that shown in FIG. 1, and is much easier to install.

The grommet 200 illustrated in FIG. 2 may be used with a fiber optic enclosure having an opening adapted to receive the grommet, so as to provide a substantially sealed passage for one or more fiber optic cables passing through the grommet and the opening. According to several embodiments and as shown in FIG. 2, the grommet 200 comprises a U-shaped central portion 210 defining an inner face 215 and a first portion of an outer face 250 of the grommet, where the inner face 215 and outer face 250 are separated by a first thickness t1. The U-shaped central portion 210 further includes a thinned, penetrable region 220 at or near a center area of the U-shaped central portion 210 and forming part of the first portion of the outer face 250 of the grommet, the thinned, penetrable region 220 having a second thickness t2 that is substantially smaller than the first thickness t1.

The grommet 200 further includes a pair of winged portions 230 extending laterally from the U-shaped central portion, each winged portion 230 defining an additional portion of the outer face 250 and having an inner surface 235 opposite the additional portion of the outer face 250 and separated from the additional portion of the outer face by a third thickness t3, which is substantially smaller than the first thickness t1. A slot 235 having inner and outer sidewalls extends around the outer periphery of a U-shaped wall formed by the U-shaped central portion 210, and is positioned so that the outer sidewall is planar with and forms a continuous surface with the inner surface 245 of the winged portions 230. A retention feature 240 extends from the inner surface 245 of each winged portion 230, each retention feature 240 having a sidewall 260 substantially perpendicular to the inner surface 245 of the winged portion 230. In some embodiments, including the embodiment shown in FIG. 2, each retention feature 240 comprises a disc-shaped protrusion extending from the inner surface 245 of the corresponding winged portion 230. It will be appreciated, however, that other shapes of the retention feature 240 may be used.

In some embodiments, the thinned, penetrable region comprises a slit 270 extending along the outer face 250 of the grommet 200 and extending at least partly through the thinned, penetrable region. In some of these and in some other embodiments, the thinned, penetrable region 220 may include one or more perforations extending at least partly through the thinned, penetrable region 220. The slit 270 and/or the perforations provide a means for penetrating the outer face 250 so that one or more fiber optic cables may be passed through the grommet. The thickness and strength of the thinned portion is such that the grommet as a whole maintains its shape, other than some displacement of the thinned, penetrable region 220, even when the outer face 250 is penetrated by one or more cables. This allows the grommet to be used as a reliable seal when installed in an opening of a fiber optic enclosure. Note that the outer face need not be penetrated at all in the event that the grommet is used to seal an unused opening in a fiber optic enclosure.

Figure 3:
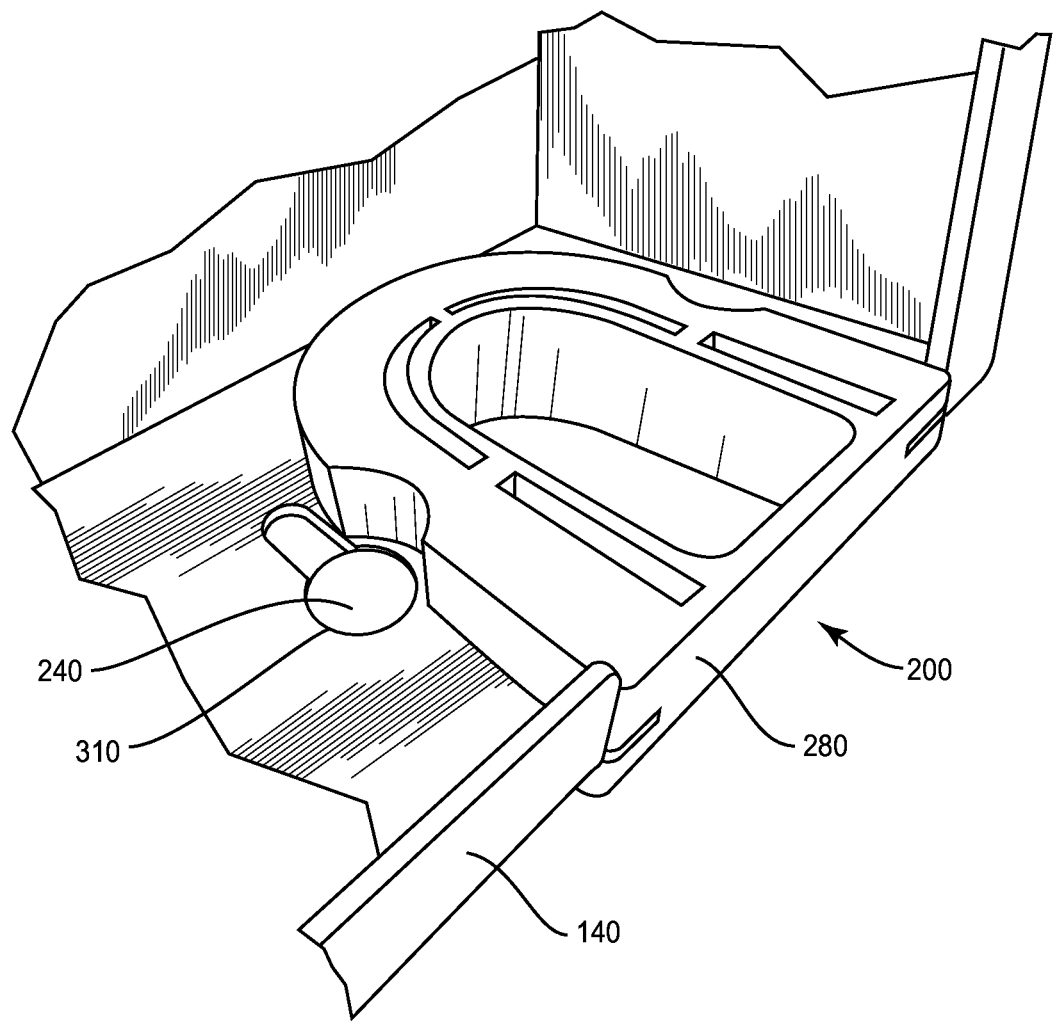
FIG. 3 shows the grommet of FIG. 2 installed in an opening in a fiber optic enclosure.

FIG. 3 shows grommet 200 as installed in a U-shaped opening in a sidewall of a fiber optic enclosure. The opening in the sidewall is dimensioned so that it is slightly smaller than the U-shaped central portion of the grommet 200. The grommet 200 is slid into the opening of the enclosure, so that the relatively thin edges of the enclosure opening engage with the slot that extends around the U-shaped central portion of the grommet.

When the grommet 200 has been pushed completely into the opening, the retention features 240 on the winged portions of the grommet "snap" into the additional openings 310 in the enclosure sidewall. Accordingly, when the grommet 200 fully occupies the opening of the sidewall, the retaining features are interlocked/engaged with the additional openings 310, so that the grommet 200 is secured into position. The interlocking retention features also help position the grommet squarely within the enclosure opening. Preferably, but not necessarily, the grommet 200 and its retaining features 240 are dimensioned and arranged so that an end surface 280 of the grommet 200 is coplanar with and forms a nearly continuous, flat surface with top side 140 of the enclosure's side wall, when the grommet 200 is in position and the retaining features 240 are fully engaged with the openings 310. This allows the underside of an enclosure lid (not shown) to form a tight and substantially continuous seal with the enclosure side walls, especially if a gasket, foam seal, or the like, is applied to the underside of the enclosure lid or along the top side 140 of the side wall and along the end surface 280 of the grommet 200.

The grommet 200 can be removed by bending the winged portions back slightly, thus disengaging the retaining features 240 from the additional openings 310, before sliding the grommet from the U-shaped opening.

Figure 4:
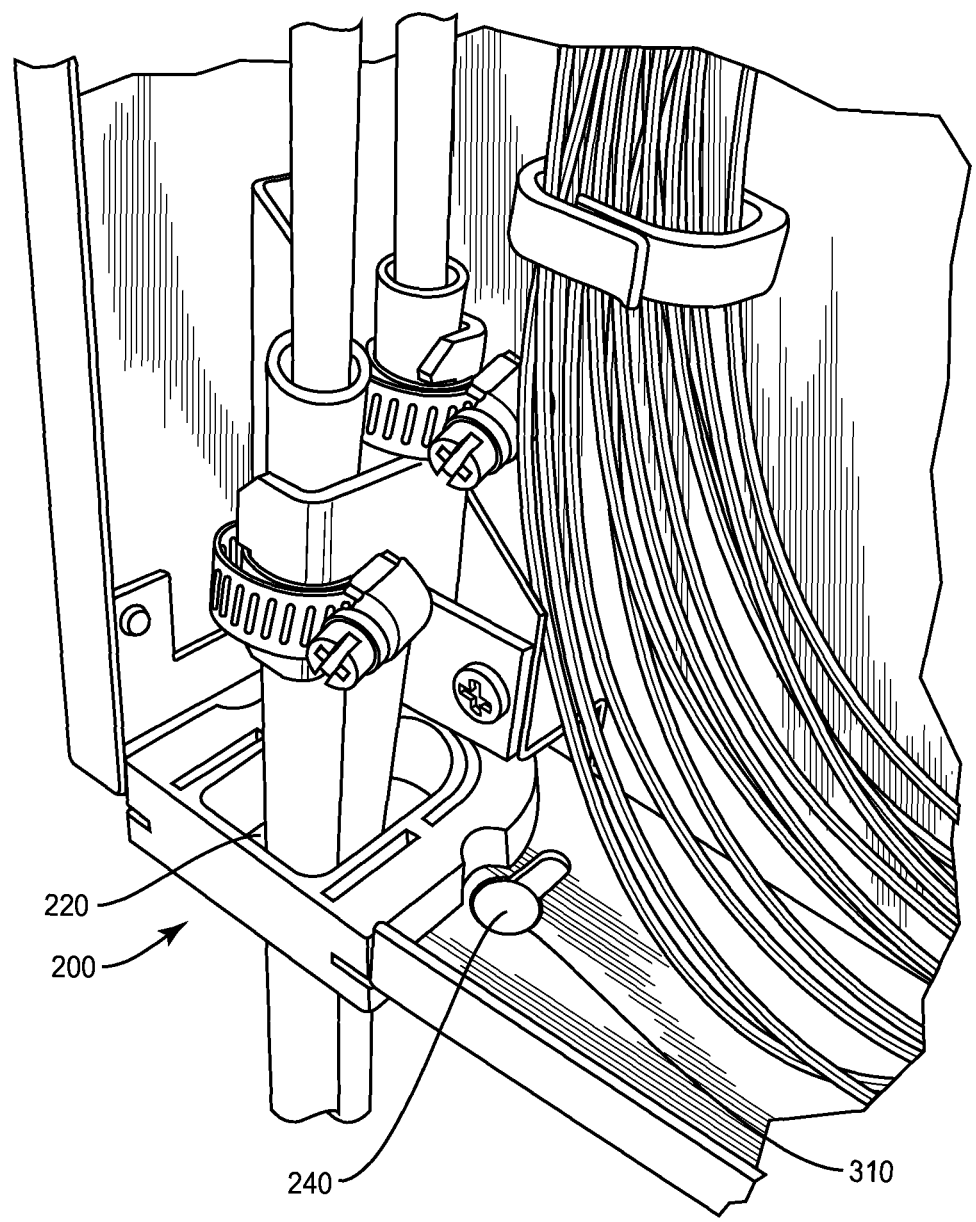
FIG. 4 illustrates another view of the grommet of FIG. 2 installed in a fiber optic enclosure.

FIG. 4 shows another view of grommet 200 installed in enclosure 100. In this case two fiber optic cables 410 have been passed through the grommet 200 (and through the U-shaped opening in the enclosure 100) and secured to the enclosure 100 using a bracket 420 and claims 430.

The foregoing description and the accompanying drawings represent non-limiting examples of the apparatus taught herein. Accordingly, it should be understood that the present invention is not limited by details of the foregoing description and accompanying drawings bus is instead limited only by the appended claims and their legal equivalents.

What is claimed is:

1. A grommet for use with a single-walled fiber optic enclosure having an opening adapted to receive the grommet so as to provide a substantially sealed passage for one or more fiber optic cables passing through the grommet and the opening, the grommet comprising:

a U-shaped central portion defining an inner face and a first portion of an outer face of the grommet, wherein the inner face and outer face are separated by a first thickness, the U-shaped central portion further including a thinned, penetrable region at or near a center area of the U-shaped central portion and forming part of the first portion of the outer face of the grommet, the thinned, penetrable region having a second thickness substantially smaller than the first thickness;

a pair of winged portions extending laterally from the U-shaped central portion, each winged portion defining an additional portion of the outer face and having an inner surface opposite the additional portion of the outer face and separated from the additional portion of the outer face by a third thickness that is substantially smaller than the first thickness;

a slot having inner and outer sidewalls extending around the entire outer periphery of a U-shaped wall formed by the U-shaped central portion, wherein the outer sidewall is planar with and forms a continuous surface with the inner surface of the winged portions; and a retention feature unitary with and extending from the inner surface of each winged portion, each retention feature having a sidewall substantially perpendicular to the inner surface of the winged portion and each retention feature comprising a disc-shaped protrusion extending from the inner surface of the corresponding winged portion each for being received in a circular aperture in the single wall of the enclosure.

2. The grommet of claim 1, wherein the thinned, penetrable region comprises a slit extending along the outer face of the grommet and extending at least partly through the thinned, penetrable region.

3. The grommet of claim 1, wherein the thinned, penetrable region comprises one or more perforations extending at least partly through the thinned, penetrable region.

4. A fiber optic enclosure system comprising:
 a single-walled housing comprising a plurality of outer walls defining a housing interior volume; and
 a grommet, the grommet comprising:
  a U-shaped central portion defining an inner face and a first portion of an outer face of the grommet, wherein the inner face and outer face are separated by a first thickness, the U-shaped central portion further including a thinned, penetrable region at or near a center area of the U-shaped central portion and forming part of the first portion of the outer face of the grommet, the thinned, penetrable region having a second thickness substantially smaller than the first thickness;
  a pair of winged portions extending laterally from the U-shaped central portion, each winged portion defining an additional portion of the outer face and having an inner surface opposite the additional portion of the outer face and separated from the additional portion of the outer face by a third thickness that is substantially smaller than the first thickness;
  a slot having inner and outer sidewalls extending around the outer periphery of a U-shaped wall formed by the U-shaped central portion, wherein the outer sidewall is planar with and forms a continuous surface with the inner surface of the winged portions; and
  a retention feature unitary with and extending from the inner surface of each winged portion, each retention feature having a sidewall substantially perpendicular to the inner surface of the winged portion;
 wherein a first outer wall of the housing comprises a substantially U-shaped opening dimensioned to receive the grommet so that the grommet fully occupies the U-shaped opening and so that an edge of the substantially U-shaped opening is positioned within the slot of the grommet, the first outer wall further comprising a pair of openings separate from the substantially U-shaped opening, extending through the first outer wall in the same direction as the substantially U-shaped opening extends through the first outer wall, and positioned and dimensioned to receive the retention features of the grommet when the grommet is positioned within and fully occupies the U-shaped opening, and wherein each retention feature comprises a disc-shaped protrusion extending from the inner surface of the corresponding winged portion, and wherein each one of the pair of openings on the at least one outer wall includes a circular aperture dimensioned to receive one of the disc-shaped protrusions.

* * * * *